(12) United States Patent
Ooe et al.

(10) Patent No.: US 11,158,457 B2
(45) Date of Patent: Oct. 26, 2021

(54) DIELECTRIC CERAMIC COMPOSITION AND MULTILAYER CERAMIC CAPACITOR

(71) Applicant: Murata Manufacturing Co., Ltd., Nagaokakyo (JP)

(72) Inventors: Yasuko Ooe, Nagaokakyo (JP); Tatsuya Izumi, Nagaokakyo (JP); Tomotaka Hirata, Nagaokakyo (JP)

(73) Assignee: MURATA MANUFACTURING COMPANY, LTD., Kyoto (JP)

(*) Notice: Subject to any disclaimer, the term of this patent is extended or adjusted under 35 U.S.C. 154(b) by 0 days.

(21) Appl. No.: 16/659,596

(22) Filed: Oct. 22, 2019

(65) Prior Publication Data

US 2020/0126723 A1 Apr. 23, 2020

(30) Foreign Application Priority Data

Oct. 23, 2018 (JP) .............................. JP2018-199294

(51) Int. Cl.
*C04B 35/49* (2006.01)
*H01G 4/008* (2006.01)
*H01G 4/12* (2006.01)

(52) U.S. Cl.
CPC ........... *H01G 4/1218* (2013.01); *C04B 35/49* (2013.01); *H01G 4/008* (2013.01); *H01G 4/1236* (2013.01)

(58) Field of Classification Search
CPC ....... C04B 35/49; C04B 35/465; C04B 35/47; C04B 35/486; C04B 2235/3203; C04B 2235/3208; C04B 2235/3213; C04B 2235/3215; C04B 2235/3232; C04B 2235/3262; C04B 2235/3418; C04B 2235/6025; C04B 2235/768; H01G 4/008; H01G 4/1218; H01G 4/1236; H01G 4/12
USPC ...... 361/321.2, 301.4, 321.5, 321.4; 174/260
See application file for complete search history.

(56) References Cited

U.S. PATENT DOCUMENTS

| | | | | |
|---|---|---|---|---|
| 4,700,266 A | * | 10/1987 | Chazono | ................. C04B 35/47 361/321.4 |
| 2003/0125191 A1 | * | 7/2003 | Kim | ..................... H01G 4/1245 501/135 |
| 2008/0044344 A1 | * | 2/2008 | Shikida | ................... C04B 35/48 423/598 |
| 2010/0214717 A1 | * | 8/2010 | Nakamura | .......... C04B 35/4682 361/303 |

(Continued)

FOREIGN PATENT DOCUMENTS

| | | | |
|---|---|---|---|
| CN | 107304130 A | * 10/2017 | ............. C04B 35/22 |
| JP | 63-224105 A | 9/1988 | |

(Continued)

*Primary Examiner* — Timothy J Thompson
*Assistant Examiner* — Guillermo J Egoavil
(74) *Attorney, Agent, or Firm* — Keating & Bennett, LLP

(57) ABSTRACT

A dielectric ceramic composition includes, as a main component, a perovskite compound containing Sr and Zr and may contain Ca and/or Ti, further contains Li and Si, and may contain Mn. When a total content of Zr and Ti is 100 parts by mol, a total content (100×m) of parts by mol of Sr and Ca is $0.8 \leq m \leq 1.3$, a content a of parts by mol of Mn is $0 \leq a \leq 10$, a content b of parts by mol of Li is $5 \leq b \leq 15$, a content c of parts by mol of Si is $20 \leq c \leq 40$, a molar ratio x of Ca/(Sr+Ca) is $0 \leq x \leq 0.8$, and a molar ratio y of Ti/(Zr+Ti) is $0 \leq y \leq 0.5$.

17 Claims, 1 Drawing Sheet

(56) References Cited

U.S. PATENT DOCUMENTS

| | | | | |
|---|---|---|---|---|
| 2011/0216472 A1* | 9/2011 | Nakamura | ............... | H01G 4/06 361/321.4 |
| 2012/0057272 A1* | 3/2012 | Hirata | .................... | H01G 4/008 361/321.4 |
| 2013/0222971 A1* | 8/2013 | Nishimura | ............... | H01G 4/12 361/301.4 |
| 2013/0342958 A1* | 12/2013 | Suzuki | .................. | C04B 35/638 361/301.4 |
| 2014/0043722 A1* | 2/2014 | Hirata | .................. | H01G 4/1245 361/301.4 |
| 2014/0049877 A1* | 2/2014 | Suzuki | ................. | H01G 4/1245 361/321.4 |
| 2014/0085768 A1* | 3/2014 | Saito | ........................ | H01G 4/30 361/301.4 |
| 2014/0211367 A1* | 7/2014 | Morita | ................. | H01G 4/1209 361/301.4 |
| 2014/0355175 A1* | 12/2014 | Lee | ........................ | H01G 4/30 361/306.3 |
| 2015/0340156 A1* | 11/2015 | Masunari | ............... | H01G 4/008 361/301.4 |
| 2016/0111217 A1* | 4/2016 | Nishimura | ............... | C04B 35/49 361/301.4 |
| 2018/0204678 A1* | 7/2018 | Yamaguchi | ........... | H01G 4/1227 |
| 2019/0139704 A1* | 5/2019 | Arai | ..................... | H01G 4/0085 |
| 2019/0237257 A1* | 8/2019 | Takano | ................ | C04B 35/4682 |
| 2019/0245135 A1* | 8/2019 | Kubota | ............... | H01L 41/0973 |

FOREIGN PATENT DOCUMENTS

| | | | | |
|---|---|---|---|---|
| JP | 63289709 A | * | 11/1988 | ............. C04B 35/49 |
| JP | 10335169 A | * | 12/1998 | ............. C04B 35/49 |
| JP | 2003-212650 A | | 7/2003 | |
| JP | 2005228904 A | * | 8/2005 | ............... H01G 4/12 |
| JP | 2007-91588 A | | 4/2007 | |

* cited by examiner

DIELECTRIC CERAMIC COMPOSITION AND MULTILAYER CERAMIC CAPACITOR

CROSS REFERENCE TO RELATED APPLICATIONS

This application claims the benefit of priority to Japanese Patent Application No. 2018-199294 filed on Oct. 23, 2018. The entire contents of this application are hereby incorporated herein by reference.

BACKGROUND OF THE INVENTION

1. Field of the Invention

The present invention relates to a dielectric ceramic composition and a multilayer ceramic capacitor.

2. Description of the Related Art

Japanese Patent Application Laid-Open No. 2007-91588 discloses a reduction resistant dielectric composition that includes a main raw material of $(Ca_{1-x}Sr_x)_m(Zr_{1-y}Ti_y)O_3$ (where, in the formula, $0 \leq x \leq 1$, $0.09 \leq y \leq 0.35$, $0.7 \leq m \leq 1.05$) and a glass component of 0.5% to 10% by weight of $aMnO-bSiO_2-cAl_2O_3$ (where, in the formula, $a+b+c=100$, $20 \leq a \leq 60$, $10 \leq b \leq 65$, $1 \leq c \leq 10$).

However, in a multilayer ceramic capacitor using the reduction resistant dielectric composition as described in Japanese Patent Application Laid-Open No. 2007-91588, securing the bondability between an internal electrode layer and a dielectric layer, and securing the bondability between an external electrode and the dielectric layer while satisfying a COG characteristic have been difficult, and the moisture resistance reliability has been insufficient.

SUMMARY OF THE INVENTION

Preferred embodiments of the present invention provide dielectric ceramic compositions that are each capable of securing bondability between an internal electrode layer and a dielectric layer and securing bondability between an external electrode and the dielectric layer while satisfying a COG characteristic, and multilayer ceramic capacitors including the dielectric ceramic compositions.

A dielectric ceramic composition according to a preferred embodiment of the present invention includes, as a main component, a perovskite compound containing Sr and Zr and may contain Ca and/or Ti, further contains Li and Si, and may contain Mn. When a total content of Zr and Ti is 100 parts by mol, a total content ($100 \times m$) of parts by mol of Sr and Ca is $0.8 \leq m \leq 1.3$, a content a of parts by mol of Mn is $0 \leq a \leq 10$, a content b of parts by mol of Li is $5 \leq b \leq 15$, a content c of parts by mol of Si is $20 \leq c \leq 40$, a molar ratio x of Ca/(Sr+Ca) is $0 \leq x \leq 0.8$, and a molar ratio y of Ti/(Zr+Ti) is $0 \leq y \leq 0.5$.

Further, a multilayer ceramic capacitor according to a preferred embodiment of the present invention includes a laminate including a plurality of dielectric layers containing a dielectric ceramic composition according to a preferred embodiment of the present invention, and a plurality of internal electrode layers disposed between the dielectric layers, and a plurality of external electrodes disposed on an outer surface of the laminate and electrically connected to the internal electrode layers. The external electrode includes a baked layer containing a glass frit, and a metal plating layer provided on the baked layer.

When a dielectric ceramic composition according to a preferred embodiment of the present invention is used, the multilayer ceramic capacitor that can secure the bondability between the internal electrode layer and the dielectric layer, and can also secure the bondability between the external electrode and the dielectric layer while satisfying a COG characteristic can be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
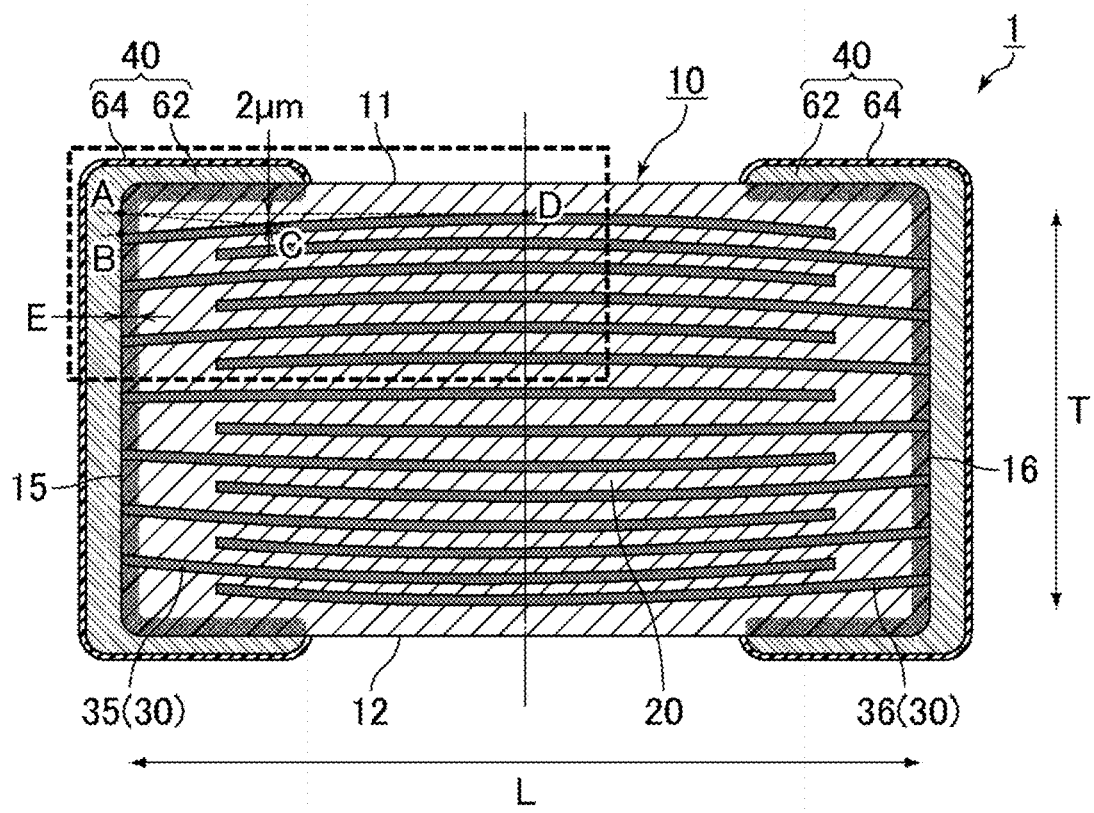
FIG. 1 is a cross-sectional view schematically showing an example of a multilayer ceramic capacitor according to a preferred embodiment of the present invention.

Hereinafter, dielectric ceramic compositions and multilayer ceramic capacitors according to preferred embodiments of the present invention will be described with reference to the drawings. However, the present invention is not limited to configurations described below, and can be appropriately modified and applied without departing from the gist of the present invention. Further, the present invention also includes a combination of two or more individual preferable configurations of the present invention described below.

Dielectric Ceramic Composition

A dielectric ceramic composition according to a preferred embodiment of the present invention includes, as a main component, a perovskite compound containing Sr and Zr and may contain Ca and/or Ti, further contains Li and Si, and may further contain Mn. When a total content of Zr and Ti is 100 parts by mol, a total content ($100 \times m$) of parts by mol of Sr and Ca is $0.8 \leq m \leq 1.3$, a content a of parts by mol of Mn is $0 \leq a \leq 10$, a content b of parts by mol of Li is $5 \leq b \leq 15$, a content c of parts by mol of Si is $20 \leq c \leq 40$. Furthermore, a molar ratio x of Ca/(Sr+Ca) is $0 \leq x \leq 0.8$, and a molar ratio y of Ti/(Zr+Ti) is $0 \leq y \leq 0.5$.

The dielectric ceramic composition "containing Sr and Zr and may contain Ca and/or Ti" means that Sr and Zr are components or elements of the perovskite compound which is the main component, and Ca and Ti are optional components.

That is, the following cases (1) to (4) are included:

(1) a case where Sr and Zr are contained and Ca and Ti are not contained;

(2) a case where Sr, Zr, and Ca are contained and Ti is not contained;

(3) a case where Sr, Zr, and Ti are contained and Ca is not contained; and (4) a case where Sr, Zr, Ca, and Ti are contained.

Further, Li, Si, and Mn are sub-components of the dielectric ceramic composition.

The dielectric ceramic composition "contains Li and Si, and may contain Mn" means that Li and Si are components or elements of the sub-components of the dielectric ceramic composition, and Mn is an optional component.

That is, the following cases (5) to (6) are included:

(5) a case where Li and Si are contained and Mn is not contained; and (6) a case where Li, Si, and Mn are contained.

Note that the main component of the dielectric ceramic composition of the present preferred embodiment includes a perovskite compound whose composition formula is represented as $(Sr_{1-x}Ca_x)_m(Zr_{1-y}Ti_y)O_3 [0 \leq x \leq 0.8, 0 \leq y \leq 0.5, 0.8 \leq m \leq 1.3]$.

In a case where all of the ranges of m, a, b, and c, and the ranges of the molar ratio x and the molar ratio y in the dielectric ceramic composition are satisfied, in a multilayer ceramic capacitor obtained by using the dielectric ceramic composition, while a COG characteristic is satisfied, the bondability between the internal electrode layer and the dielectric layer can be secured, and the bondability between the outer electrode and the dielectric layer can also be secured.

Specifically, by satisfying these ranges, an absolute value of a capacitance temperature coefficient is low, and a failure rate in an accelerated moisture resistance load test is low. Further, delamination between the internal electrode layer and the dielectric layer is less likely to occur. Furthermore, the bondability between the external electrode and the dielectric layer is good.

The dielectric ceramic composition of the present preferred embodiment can be manufactured, for example, as described below.

A method for producing the perovskite compound which is the main component in the dielectric ceramic composition is not particularly limited, and publicly-known methods, such as a solid phase method, a hydrothermal synthesis method, and a hydrolysis method, for example, can be used.

As a Sr source, a Zr source, a Ca source, and a Ti source, a carbonate, an oxide, a hydroxide, a chloride, and the like of each element, for example, can be used. Further, unavoidable impurities, such as $HfO_2$, may also be contained.

The dielectric ceramic composition of the present preferred embodiment can be obtained by preparing a compound powder as a Li source, a Si source, and a Mn source, and a mixing main component powder and the above compound powder so as to have a predetermined molar ratio. As the Li source, the Si source, and the Mn source, a carbonate, an oxide, a hydroxide, a chloride, and the like of each element, for example, can be used. Further, mixing of the main component powder and the compound powder can be performed by dry mixing or wet mixing, for example. Powder of the dielectric ceramic composition may be obtained, for example, by mixing the main component powder and the compound powder, and then drying and crushing the powder.

Further, compounds serving as a Sr source, a Zr source, a Ca source, and a Ti source may be additionally added in this stage to adjust a molar ratio.

The dielectric ceramic composition of the present preferred embodiment may further contain an additive, and examples of the additive include an organic binder, a solvent, a plasticizer, and the like.

As the organic binder, for example, polyvinyl butyral, acrylic resin, methacrylic resin, and the like can be used. As the solvent, for example, alcohol, such as toluene and isopropylene alcohol can be used. As the plasticizer, for example, di-n-butyl phthalate can be used.

The dielectric ceramic composition of the present preferred embodiment may be in the form of powder (solid) which is a mixture containing a perovskite compound as a main component, and further containing Li and Si, and may containing Mn, or in the form of a slurry obtained by adding a solvent and the like. Further, the dielectric ceramic composition of the present preferred embodiment may be in the form of a ceramic green sheet obtained, for example, by molding by a doctor blade method or the like and drying.

When a total number of mol of elements other than oxygen in the dielectric ceramic composition is 100 parts by mol, total parts by mol of Sr, Zr, Ca, and Ti in the perovskite compound are preferably about 50 parts by mol or more and about 95 parts by mol or less, for example. In such a case, the main component of the dielectric ceramic composition of the present preferred embodiment can be considered as the above-described perovskite compound.

Multilayer Ceramic Capacitor

Hereinafter, a multilayer ceramic capacitor according to a preferred embodiment of the present invention including a laminate and an external electrode will be described.

A multilayer ceramic capacitor according to the present preferred embodiment includes a laminate including a plurality of dielectric layers containing a dielectric ceramic composition according to a preferred embodiment of the present invention, and a plurality of internal electrode layers disposed between the dielectric layers, and a plurality of external electrodes disposed on an outer surface of the laminate and electrically connected to the internal electrode layers. The external electrode includes a baked layer containing a glass frit, and a metal plating layer provided on the baked layer.

FIG. 1 is a cross-sectional view schematically showing an example of the multilayer ceramic capacitor of the present preferred embodiment.

A multilayer ceramic capacitor 1 includes a laminate 10 in which dielectric layers 20 and an internal electrode layer 30 disposed between the dielectric layers 20 are laminated, and external electrodes 40 are provided on an outer surface of the laminate 10.

The laminate 10 and the multilayer ceramic capacitor 1 shown in FIG. 1 preferably have a rectangular or substantially rectangular parallelepiped shape including six surfaces, and a length direction and a lamination direction are directions defined by two-way arrows L and T, respectively. The lamination direction is a direction in which the plurality of dielectric layers 20 and the plurality of internal electrode layers 30 of the laminate 10 are laminated.

FIG. 1, which is a cross-sectional view showing the length direction and the lamination direction, is a cross-sectional view taken along LT.

Further, although not shown in the cross-sectional view of FIG. 1, a direction orthogonal or substantially orthogonal to the length direction and the lamination direction (direction perpendicular or substantially perpendicular to a paper surface) is a width direction. The length direction, the width direction, and the lamination direction are orthogonal or substantially orthogonal to each other.

The laminate 10 includes a first main surface 11 and a second main surface 12 facing in a lamination direction T indicated by a two-way arrow T in FIG. 1, and a first end surface 15 and a second end surface 16 facing in a length direction L indicated by a two-way arrow L.

Further, although not shown, a first side surface and a second side surface facing in the width direction are also included.

The dielectric layer 20 contains a dielectric ceramic composition according to a preferred embodiment of the present invention described above. The dielectric layer is a ceramic material obtained by firing the dielectric ceramic composition.

The number of dielectric layers is preferably 35 or more and 45 or less, for example.

Further, an average thickness of the dielectric layer is preferably about 2.7 μm or more and about 3.4 μm or less, and more preferably about 2.9 μm or more and about 3.2 μm or less, for example, from the viewpoint of moisture resistance, bondability, delamination occurrence probability, and a temperature characteristic (TCC).

Further, the average thickness of the dielectric layer is preferably about 1.0 μm or less, for example, from the viewpoint of downsizing of the multilayer ceramic capacitor.

The plurality of internal electrode layers 30 include a first internal electrode layer 35 and a second internal electrode layer 36 disposed in the lamination direction. The first internal electrode layer 35 extends to the first end surface 15, and the second internal electrode layer 36 extends to the second end surface 16.

The first internal electrode layer 35 includes a counter electrode portion facing the second internal electrode layer 36 across the dielectric layer 20, and an extended electrode portion extending from the counter electrode portion to the first end surface 15.

The second internal electrode layer 36 includes a counter electrode portion facing the counter electrode portion of the first internal electrode layer 35 across the dielectric layer 20, and an extended electrode portion extending from the counter electrode portion to the second end surface 16.

Capacitance is generated in the counter electrode portion where the first internal electrode layer 35 and the second internal electrode layer 36 face each other across the dielectric layer 20.

The internal electrode layer preferably contains a metal material, such as, for example, Ni, Cu, Ag, Pd, an Ag—Pd alloy, or Au.

In particular, a main component of the internal electrode layer is preferably Cu, for example. The main component means that it is about 50% by weight or more of components included in the internal electrode layer.

Further, a dielectric material of the same composition system as the ceramic material contained in the dielectric layer is also preferably included.

The number of the internal electrode layers is preferably 36 or more and 46 or less, for example.

Further, an average thickness of the internal electrode layer is preferably about 1.0 μm or more and about 1.6 μm or less, and more preferably about 1.2 μm or more and about 1.4 μm or less, for example.

Further, an average thickness of the dielectric layer is preferably about 1.0 μm or less and the average thickness of the internal electrode layer is preferably about 1.5 times or more the average thickness of the dielectric layer, for example. In this case, the average thickness of the internal electrode layer is preferably, for example, about 1.8 times or less the average thickness of the dielectric layer.

When the average thickness of the dielectric layer is about 1.0 μm or less and the average thickness of the internal electrode layer is about 1.5 times or more the average thickness of the dielectric layer, coverage and smoothness of the internal electrode layer are increased, and voltage resistance becomes higher.

For example, a break-down voltage (BDV) value in a BDV test (a test for measuring a voltage (BDV value) at which the multilayer ceramic capacitor short-circuits when an applied voltage is gradually increased) is about 40% higher than that of a multilayer ceramic capacitor in which the average thickness of the internal electrode layer is less than about 1.5 times the average thickness of the dielectric layer.

Note that a method for measuring the average thickness of the dielectric layer and the average thickness of the internal electrode layer is as described below.

First, the periphery of the multilayer ceramic capacitor is solidified with resin.

At this time, LT side surfaces (length and height side surfaces; side surfaces on which the internal electrode layer including a connection portion to the external electrode is exposed when polished) of each multilayer ceramic capacitor are exposed. The LT side surface is polished by a polishing machine, and the polishing is finished at approximately a half depth in the width direction of the laminate, so that an LT cross section appears. Ion milling is performed on this polished surface to remove sag due to polishing, and a cross section for observation is obtained.

At about ½ in the L direction (longitudinal direction) of the LT cross section, a perpendicular line orthogonal or substantially orthogonal to the internal electrode layer is drawn.

Next, a region where the internal electrode layer of a sample is laminated is divided into three equal or substantially equal portions in a T direction (height direction), so as to be divided into three regions of an upper portion U, a middle portion M, and a lower portion D. Then, five dielectric layers are selected from a center portion in the height direction of each region, and a thickness of these dielectric layers on the perpendicular line and a thickness of the internal electrode layer on the dielectric layer are measured. However, those which cannot be measured due to reasons, such as that the internal electrode layer is defective on the perpendicular line, and the dielectric layers sandwiching the internal electrode layer are connected, are excluded.

From the above, for each sample, the thicknesses of the dielectric layer and the internal electrode layer are measured at 3 regions×5 layers=15 locations, and an average value of these is obtained.

The thicknesses of the dielectric layer and the internal electrode layer can be measured using a scanning electron microscope.

Further, the average thickness of the dielectric layer is preferably about 1.0 μm or less, and an average strain angle of the internal electrode layer is preferably about 5° or less, for example.

When the average strain angle of the internal electrode layer is about 5° or less, a specific resistance value is higher than a specific resistance value of the multilayer ceramic capacitor having a large strain angle.

In a capacitor with a large strain angle, a strain in the internal electrode layer locally includes a portion with a small element thickness, which may lower a specific resistance value. However, by setting the average strain angle at about 5° or less, the lowering in the specific resistance value can be prevented.

Hereinafter, a method of obtaining the average strain angle of the internal electrode layer will be described with reference to FIG. 2.

Figure 2:
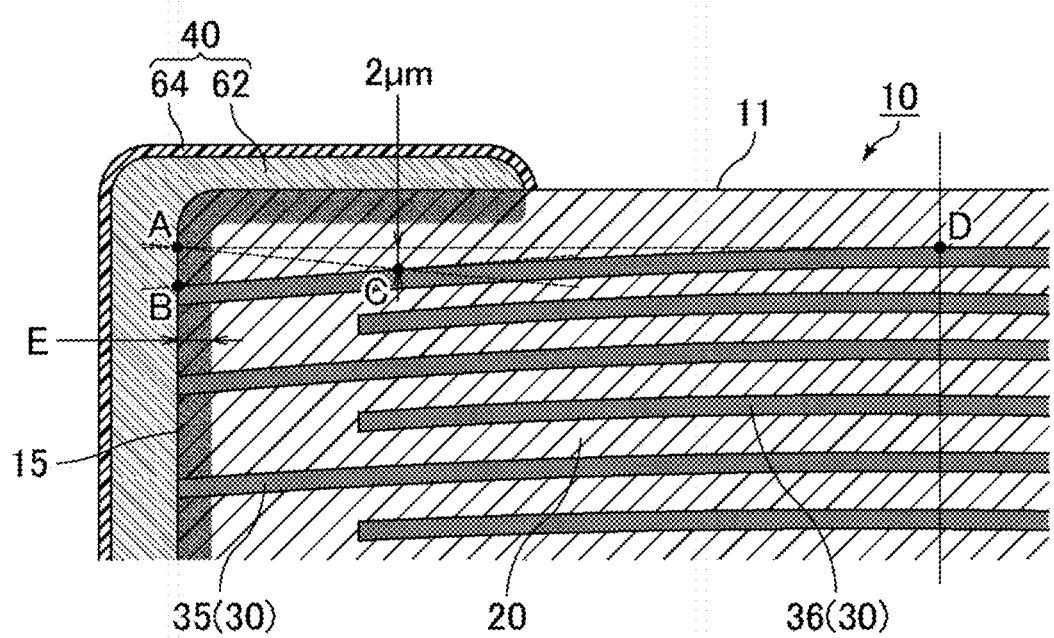
FIG. 2 is an enlarged cross-sectional view showing a portion enclosed by a broken line in FIG. 1 in an enlarged manner.

FIG. 2 is an enlarged cross-sectional view showing a portion enclosed by a broken line in FIG. 1 in an enlarged manner.

FIG. 2 shows points A, B, C, and D necessary to obtain the average strain angle of the internal electrode layer.

First, the point D which is a point of intersection of a line passing through the center of the laminate in the length direction (direction indicated by the two-way arrow L) and an upper surface of the internal electrode layer to be measured is determined.

From this point D, a line parallel or substantially parallel to the length direction of the laminate is drawn, and the point A is determined at a point of intersection with an end surface of the laminate.

Then, on a straight line connecting the point D and the point A, the point C is determined at a point where a distance between the straight line and the upper surface of the internal electrode layer is about 2 μm in the thickness direction of the laminate (direction shown by the two-way arrow T).

Further, the point B is determined at a point of intersection of the internal electrode layer to be measured and the end surface of the laminate.

Then, an angle ∠ABC formed by the point A, the point B, and the point C is taken as a strain angle of the internal electrode layer.

FIG. 2 shows a measurement position of the strain angle of the internal electrode layer at an upper left corner in the diagram. However, in one multilayer ceramic capacitor, the strain angle of the internal electrode layer is measured at four locations, which are an upper left corner, a lower left corner, an upper right corner, and a lower right corner, and an average value of the measured values of the strain angles is taken as the average strain angle of the multilayer ceramic capacitor.

Further, in a case where there are a large number of the laminated ceramic capacitors, five of the laminated ceramic capacitors are taken out, and an average value of average strain angles of the five laminated ceramic capacitors is taken as a value of an average strain angle of a large number of the laminated ceramic capacitors.

The external electrode 40 is provided on an end surface which is an outer surface of the laminate 10, and is connected to the first internal electrode layer 35 or the second internal electrode layer 36 that extends to the end surface of the laminate 10.

The external electrode 40 provided on one end surface is disposed on the first end surface 15 of the laminate 10, and preferably further extends from the first end surface 15 to the first side surface, the second side surface, the first main surface 11, and the second main surface 12. The external electrode 40 provided on the other end surface is disposed on the second end surface 16 of the laminate 10, and preferably further extends from the second end face 16 to the first side surface, the second side surface, the first main surface 11, and the second main surface 12.

The external electrode 40 includes a baked layer 62 provided on the end surface of the laminate 10 and a metal plating layer 64 disposed on the baked layer 62.

The external electrode preferably has a configuration including a baked layer containing a glass frit and a metal plating layer provided on the baked layer.

The baked layer preferably contains metal.

The metal is preferably made from, for example, at least one metal selected from a group including Ag, Ni, Cu, Au, and Pd, and more preferably contains Cu. Further, Cu and Ni are more preferably included.

The glass frit preferably contains at least one of Ba, Sr, and Ca, for example. As other elements, B, Li, Na, and the like may be contained.

A composition of the glass frit is preferably a BaO—$B_2O_3$—$SiO_2$-based glass frit or a BaO—$B_2O_3$—$SiO_2$—LiO—NaO-based glass frit, for example.

Then, when Ba is converted to BaO, Sr to SrO, and Ca to CaO with respect to 100% by weight of the glass frit, a total amount (BaO+SrO+CaO) of each component is preferably about 10% by weight or more and about 50% by weight or less, for example.

If (BaO+SrO+CaO) is in the range of about 10% by weight or more and about 50% by weight or less, the proportion of chips whose resistance value becomes too low after the moisture resistance load test is reduced (for example, the number of chips for which log IR≤6 is established after about 250 h elapses is less than about 3%), the moisture resistance is considered to be improved.

Further, for example, in terms of an oxide, $B_2O_3$ is preferably about 3% by weight or more and about 30% by weight or less, and $SiO_2$ is preferably about 3% by weight or more and about 30% by weight or less, with respect to 100% by weight of the glass frit.

The baked layer preferably contains Cu as metal as a main component. Containing Cu as a main component means that a content ratio of Cu in the baked layer is about 50 vol % or more.

Further, for example, the baked layer preferably contains Cu as a main component and further contains Ni.

When the baked layer contains Cu as a main component and further contains Ni, the bondability between the fired dielectric layer and the external electrode is improved. For example, when a cross section that has been manually polished (polished to about ½ point in the width direction) is checked with an SEM at 3000 times magnification, about 98% or more of an interface between the dielectric layer and the external electrode (baked layer) is observed to be bonded.

The metal plating layer provided on the baked layer is preferably, for example, a layer containing at least one metal selected from a group including Cu, Ni, Ag, Pd, an Ag—Pd alloy, Au, and Sn.

The metal plating layer may include a plurality of layers. Preferably, the metal plating layer has a two-layer structure of a Ni plating layer and a Sn plating layer, for example. A configuration in which the Sn plating layer is provided on the Ni plating layer is preferably employed.

Further, a diffusion region of Ba, Ca, or Sr exists in the vicinity of the interface in contact with the external electrode of the dielectric layer, and a length of the region is preferably, for example, about 3 μm or more in a normal direction from the interface of the dielectric layer and the external electrode.

In FIGS. 1 and 2, a distance from the interface of the dielectric layer in contact with the external electrode is indicated by a two-way arrow E.

Then, the diffusion region of Ba, Ca, or Sr in the vicinity of the interface in contact with the external electrode of the dielectric layer is hatched. A width of the hatched region is 3 μm or more.

The diffusion region of Ba, Ca, or Sr is a region where the concentration of Ba, Ca, or Sr is higher than that of other portions of the dielectric layer (portions far from the interface between the external electrode and the dielectric layer). By performing element mapping of the dielectric layer using a wavelength dispersion X-ray analysis method (WDX), the presence or absence of the diffusion region and the length of the region can be checked.

The diffusion region is formed by diffusion of Ba, Ca, or Sr contained in the baked layer into the dielectric layer.

If the diffusion region as described above exists in a region of about 3 μm or more in the normal direction from the interface between the dielectric layer and the external electrode, the proportion of chips whose resistance value becomes too low after the moisture resistance load test is lowered (for example, the number of chips for which log IR≤6 is established becomes less than about 5% after about 250 h elapses), the moisture resistance is considered to improve.

The multilayer ceramic capacitor of the present preferred embodiment can be manufactured, for example, as described below.

A binder, a solvent, and the like are added to the powder containing a dielectric ceramic composition according to a preferred embodiment of the present invention to prepare a slurry. This slurry is formed into a sheet by a doctor blade method, and is cut to obtain a ceramic green sheet of a predetermined size. Separately, a conductive paste for the internal electrode layer is prepared.

Then, a conductive paste for the internal electrode layer is applied to the ceramic green sheet in a predetermined pattern, for example, by screen printing or gravure printing to form an internal electrode pattern.

A predetermined number of ceramic green sheets for an outer layer on which the internal electrode pattern is not printed are laminated, the ceramic green sheets on which the internal electrode pattern is printed are sequentially laminated, and a predetermined number of the ceramic green sheets for the outer layer are laminated on the above, so as to manufacture a laminated sheet.

The laminated sheet is pressed in the laminating direction by an isostatic press or the like, for example, to produce a laminated block.

The laminated block is cut into a predetermined size, and a laminated chip is cut out. At this time, a corner and a ridge of the laminated chip may be rounded by, for example, barrel polishing or the like.

The laminated chip is fired to produce a laminate.

When using a paste which includes Cu as a main component as a conductive paste for the internal electrode layer, a calcination temperature is preferably about 850° C. or more and about 1050° C. or less, for example.

When using a paste which includes Ni as a main component as a conductive paste for the internal electrode layer, a calcination temperature is preferably about 1100° C. or more and about 1300° C. or less, for example.

Subsequently, an external electrode is formed on the end surface of the laminate from which the internal electrode layer extends from the laminate.

The end surfaces of the laminate may be subjected to barrel polishing to ensure the internal electrode layer extend from the laminate.

A conductive paste to be a baked layer for forming the external electrode is prepared. For example, metal particles, such as Cu particles, a glass frit, resin (acrylic resin, cellulose resin, butyral resin, and the like), a solvent (terpineol, and the like), and the like are added to prepare a conductive paste. The conductive paste is applied to both end surfaces of the laminate and baked to form a baked layer. A baking temperature is preferably about 700° C. or more and about 900° C. or less, for example. Further, the baking is preferably performed in non-oxidizing atmosphere.

Furthermore, metal plating is applied to a surface of the baked layer to form a metal plating layer, so that the external electrode is formed.

Through the above steps, the multilayer ceramic capacitor can be manufactured.

Examples

Hereinafter, examples that more specifically disclose the dielectric ceramic compositions and the multilayer ceramic capacitors according to preferred embodiments of the present invention will be described. Note that the present invention is not limited to only these examples.

Sample No. 1-51

Manufacture of Multilayer Ceramic Capacitor

As a material defining the main component, $CaCO_3$, $SrCO_3$, $TiO_2$, and $ZrO_2$ having purity of about 99% or more were prepared. Each material was weighed to have loading values shown in Table 1, and wet mixed by a ball mill, and then dried and crushed. The powder was calcined at about 1200° C. for about 2 h in the air and then crushed to obtain main component powder.

Subsequently, powder of $SiO_2$, $MnCO_3$, and $Li_2O$ was prepared as an additive material, and the main component powder and the additive material were weighed to have the loading values shown in Table 1 (the contents a, b, and c parts by mol of Mn, Li, and Si with respect to 100 parts by mol of a total content of Zr and Ti), then were wet mixed by a ball mill, and, after that, were dried and crushed to obtain dielectric ceramic composition powder.

Note that, in Table 1, those marked with * in the sample number are dielectric ceramic composition powder outside of the scope of the present invention. Note that, when ICP analysis was performed for the obtained dielectric ceramic composition powder, the powder was confirmed to be the same or almost the same as the preparation composition shown in Table 1.

A polyvinyl butyral-based binder and ethanol were added to this dielectric ceramic composition powder, and wet mixed by a ball mill to prepare a slurry. Then, this slurry was formed into a sheet by a doctor blade method, and was cut to obtain a rectangular ceramic green sheet of about 15 cm by about 15 cm with a thickness of about 4 μm.

After the above, a conductive paste mainly including Cu was applied onto the ceramic green sheet to form a conductive paste layer defining the internal electrode layer of the multilayer ceramic capacitor.

Next, a plurality of the ceramic green sheets on which the conductive paste layer was formed were laminated so that the sides from which the conductive paste layers extend alternated, and were pressure bonded and cut to obtain the laminated chip. These laminated chips are heated to a temperature of about 250° C. in the air to burn the binder, and then fired at a top temperature of about 1000° C. in a non-oxidizing atmosphere of nitrogen-water-hydrogen to obtain the laminate. Barrel polishing is performed on the end surface of the laminate such that the internal electrode layer extended from the end surface more reliable.

A conductive paste for forming a baked layer was prepared.

The detailed specifications of the conductive paste were as described below.

Solid content: about 30 vol % (the remaining 70 vol % is acrylic resin and terpineol)

Ratio of Cu powder in solid content: about 90 vol %

Ratio of glass frit in solid content: about 10 vol %

Composition of glass frit: $BaO$—$B_2O_3$—$SiO_2$—$LiO$—$NaO$-based glass frit

Specifically, when the glass frit is 100% by weight, in terms of an oxide, one with BaO: about 5% by weight, $B_2O_3$: about 20% by weight, $SiO_2$: about 20% by weight, LiO+NaO: about 55% by weight was used.

The conductive paste was applied to the end surface of the laminate, dried, and fired in a non-oxidizing atmosphere at a top temperature of about 800° C. to form a baked layer. Subsequently, a Ni plating layer was formed on the baked layer by a barrel plating method, and then a Sn plating layer was similarly formed to form an external electrode, and a multilayer ceramic capacitor was obtained.

External dimensions of the multilayer ceramic capacitor thus obtained were: width: about 1.2 mm, length: about 2.0 mm, height: about 0.6 mm, and the average thickness of the dielectric layer was about 3.2 µm.

The total number of the dielectric layers was 40.

Further, the average thickness of the internal electrode layer was about 1.4 µm. The external electrode of this laminated ceramic capacitor was removed by polishing, and the obtained laminate was made into a solution by an alkali fusion method. An ICP analysis was performed for this solution, and the composition was confirmed to be the same or almost the same to the preparation composition shown in Table 1, except for Cu of the internal electrode layer component.

Evaluation Test

Evaluation of Bondability Between Dielectric Layer and External Electrode

An image at 3000 times magnification was taken with an SEM on a cross section (polished to about ½ point in the width direction) obtained by manually polishing five samples, and the bondability of the interface between the dielectric layer and the external electrode was checked.

A bondability evaluation for one in which about 95% or more of the interface between the dielectric layer and the external electrode was bonded for both the external electrodes in all of the five samples was "○".

In the above evaluation method, a bondability evaluation for one having one or more samples in which less than about 95% of the interface between the dielectric layer and the external electrode was bonded was "X". Results are shown in Table 1.

Bondability Evaluation Between Dielectric Layer and Internal Electrode Layer: Delamination Evaluation An image at 3000 times magnification was taken with an SEM for the center of the LT cross section on a cross section (polished to about ½ point in the width direction) obtained by manually polishing for ten samples, and the bondability of the interface between the dielectric layer and the internal electrode was checked.

A delamination evaluation for one with no peeling between the dielectric layer and the internal electrode layer in all of the ten samples was "○".

A delamination evaluation for one with one or more samples in which peeling was present between the dielectric layer and the internal electrode layer in the ten samples was "X". Results are shown in Table 1.

Accelerated Moisture Resistance Load Test (PCBT)

The test was performed under the conditions of a temperature of about 125° C., a humidity of about 95% RH, an applied voltage of about 50V, and 100 samples, and the number of chips for which log IR≤6 was established in IR(Ω) after 250 h elapses was counted as the number of NG. One with the number of NG is about 10% or more (10/100 or more) was considered defective. Results are shown in Table 1.

Capacitance Temperature Coefficient: TCC

Capacitance measurement was performed under the conditions of about 1 kHz-1 Vrms at about −55° C. to about 125° C. so as to calculate a capacitance temperature coefficient based on about 25° C. One with the coefficient higher than about +30 ppm/° C. and lower than about −30 ppm/° C. was regarded as NG. Results are shown in Table 1.

TABLE 1

| Sample No. | | x, y, m in main component | | | Mn | Li | Si | Bondability between dielectric layer and external electrode | Delamination | TCC (ppm/° C.) | | Number of NG in accelerated moisture resistance load test |
|---|---|---|---|---|---|---|---|---|---|---|---|---|
| | | x | y | m | a | b | c | | | −55° C. | 125° C. | |
| 1 | | 0 | 0 | 0.8 | 3 | 5 | 20 | ○ | ○ | 12 | 25 | 5/100 |
| 2 | | 0 | 0.5 | 0.8 | 5 | 5 | 40 | ○ | ○ | 13 | 14 | 7/100 |
| 3 | | 0 | 0.3 | 1.3 | 7 | 5 | 40 | ○ | ○ | 16 | 25 | 9/100 |
| 4 | * | 0.1 | 0 | 0.8 | 13 | 8 | 35 | ○ | ○ | 72 | 45 | 7/100 |
| 5 | | 0.1 | 0.5 | 0.8 | 7 | 5 | 40 | ○ | ○ | 3 | 1 | 5/100 |
| 6 | * | 0.1 | 0.6 | 0.6 | 3 | 8 | 35 | X | X | 74 | 33 | 23/100 |
| 7 | * | 0.1 | 0.3 | 0.8 | 20 | 8 | 25 | ○ | ○ | −33 | 38 | 12/100 |
| 8 | | 0.2 | 0 | 0.8 | 3 | 5 | 40 | ○ | ○ | 15 | 5 | 6/100 |
| 9 | * | 0.2 | 0 | 0.8 | 0 | 8 | 10 | X | X | 36 | 55 | 11/100 |
| 10 | * | 0.2 | 0 | 0.8 | 2 | 17 | 25 | ○ | ○ | 46 | 35 | 10/100 |
| 11 | | 0.2 | 0.5 | 0.8 | 5 | 5 | 40 | ○ | ○ | 17 | 7 | 8/100 |
| 12 | * | 0.2 | 0.5 | 0.8 | 3 | 8 | 45 | X | X | −37 | −60 | 8/100 |
| 13 | | 0.2 | 0.5 | 0.8 | 7 | 5 | 20 | ○ | ○ | 10 | 28 | 7/100 |
| 14 | * | 0.2 | 0.3 | 0.6 | 14 | 8 | 25 | ○ | ○ | 60 | 41 | 12/100 |
| 15 | | 0.4 | 0 | 0.8 | 3 | 5 | 20 | ○ | ○ | 25 | 22 | 5/100 |
| 16 | * | 0.4 | 0 | 0.6 | 4 | 8 | 35 | ○ | ○ | 73 | 49 | 11/100 |
| 17 | * | 0.4 | 0 | 0.8 | 6 | 17 | 35 | ○ | ○ | 55 | 36 | 10/100 |
| 18 | * | 0.4 | 0.5 | 0.8 | 12 | 8 | 35 | ○ | ○ | −40 | 49 | 12/100 |
| 19 | | 0.4 | 0.5 | 0.8 | 9 | 5 | 40 | ○ | ○ | −5 | 21 | 5/100 |
| 20 | * | 0.4 | 0.5 | 1.3 | 3 | 16 | 10 | X | X | 52 | 47 | 13/100 |
| 21 | | 0.6 | 0.3 | 1.3 | 5 | 5 | 40 | ○ | ○ | 1 | 4 | 5/100 |
| 22 | | 0.6 | 0 | 0.8 | 3 | 5 | 40 | ○ | ○ | 2 | 7 | 6/100 |
| 23 | * | 0.6 | 0 | 0.8 | 2 | 3 | 20 | ○ | X | 5 | 12 | 7/100 |
| 24 | | 0.6 | 0.5 | 0.8 | 3 | 5 | 20 | ○ | ○ | −20 | 14 | 6/100 |
| 25 | | 0.6 | 0.5 | 0.8 | 0 | 5 | 40 | ○ | ○ | 25 | 26 | 9/100 |
| 26 | | 0.6 | 0.3 | 1.3 | 3 | 15 | 20 | ○ | ○ | 6 | 11 | 5/100 |
| 27 | * | 0.6 | 0.3 | 0.8 | 15 | 8 | 35 | ○ | ○ | 70 | 37 | 11/100 |
| 28 | | 0.7 | 0 | 0.8 | 3 | 5 | 40 | ○ | ○ | 5 | 10 | 6/100 |
| 29 | | 0.7 | 0 | 0.8 | 5 | 5 | 20 | ○ | ○ | 14 | 7 | 9/100 |
| 30 | | 0.7 | 0 | 0.8 | 7 | 5 | 40 | ○ | ○ | 6 | 3 | 7/100 |
| 31 | * | 0.7 | 0.5 | 0.8 | 3 | 17 | 10 | X | ○ | 41 | 42 | 11/100 |

TABLE 1-continued

| Sample No. | x, y, m in main component | | | Mn a | Li b | Si c | Bondability between dielectric layer and external electrode | Delamination | TCC (ppm/° C.) | | Number of NG in accelerated moisture resistance load test |
|---|---|---|---|---|---|---|---|---|---|---|---|
| | x | y | m | | | | | | −55° C. | 125° C. | |
| 32 * | 0.7 | 0.5 | 1.5 | 3 | 8 | 35 | ○ | ○ | 38 | 55 | 19/100 |
| 33 * | 0.7 | 0.5 | 0.8 | 12 | 8 | 25 | ○ | ○ | 67 | 51 | 6/100 |
| 34   | 0.7 | 0.5 | 0.8 | 3 | 5 | 40 | ○ | ○ | 7 | 6 | 7/100 |
| 35   | 0.8 | 0   | 0.8 | 0 | 5 | 20 | ○ | ○ | 9 | 15 | 5/100 |
| 36 * | 0.8 | 0   | 0.6 | 3 | 8 | 45 | X | X | 40 | 44 | 14/100 |
| 37   | 0.8 | 0   | 0.8 | 3 | 5 | 20 | ○ | ○ | 22 | 2 | 5/100 |
| 38   | 0.8 | 0   | 0.8 | 5 | 5 | 20 | ○ | ○ | −2 | 4 | 9/100 |
| 39 * | 0.8 | 0   | 0.8 | 12 | 8 | 35 | ○ | ○ | 36 | 62 | 6/100 |
| 40 * | 0.8 | 0   | 1.5 | 3 | 8 | 25 | ○ | ○ | 39 | −40 | 12/100 |
| 41 * | 0.8 | 0.5 | 0.8 | 12 | 8 | 35 | ○ | ○ | −39 | 68 | 9/100 |
| 42 * | 0.8 | 0.5 | 0.6 | 3 | 8 | 25 | ○ | ○ | 43 | 71 | 7/100 |
| 43 * | 0.8 | 0.5 | 0.6 | 3 | 8 | 10 | X | X | 55 | −55 | 10/100 |
| 44   | 0.8 | 0   | 0.8 | 3 | 5 | 40 | ○ | ○ | 25 | −20 | 9/100 |
| 45   | 0.8 | 0   | 0.8 | 10 | 5 | 20 | ○ | ○ | −3 | 5 | 7/100 |
| 46   | 0.8 | 0.5 | 0.8 | 3 | 5 | 40 | ○ | ○ | −10 | −13 | 7/100 |
| 47 * | 0.8 | 0.6 | 0.8 | 2 | 8 | 25 | X | X | 41 | 35 | 12/100 |
| 48   | 0.8 | 0.3 | 0.8 | 5 | 5 | 40 | ○ | ○ | 16 | 9 | 5/100 |
| 49 * | 1   | 0   | 0.8 | 3 | 5 | 30 | ○ | ○ | 12 | 5 | 10/100 |
| 50 * | 1   | 0.5 | 0.8 | 5 | 8 | 35 | ○ | X | 35 | 8 | 13/100 |
| 51 * | 1   | 0.3 | 0.8 | 5 | 5 | 40 | X | X | −3 | 25 | 14/100 |

From these results, it has become clear that, assuming that the total content of Zr and Ti is 100 parts by mol, when the total content (100×m) of parts by mol of Sr and Ca is 0.8≤m≤1.3, and the content a of parts by mol of Mn is 0≤a≤10, the content b of parts by mol of Li is 5≤b≤15, the content c of parts by mol of Si is 20≤c≤40, furthermore, the molar ratio x of Ca/(Sr+Ca) is 0≤x≤0.8 and, furthermore, the molar ratio y of Ti/(Zr+Ti) is 0≤y≤0.5, the bondability between the external electrode and the dielectric layer becomes high, the occurrence of delamination between the dielectric layer and the internal electrode layer is reduced or prevented, the moisture resistance is improved, and a COG characteristic is satisfied.

Sample No. 52-56

The steps to obtain a laminate was similar to that of the sample No. 25.

A conductive paste different from that of the sample No. 25 was prepared as a conductive paste for forming the baked layer.

The detailed specifications of the conductive paste were as described below.

Solid content: about 30 vol % (the remaining 70 vol % is acrylic resin and terpineol)

Ratio of metal powder to solid content: about 90 vol % (metal powder is Cu powder or mixed powder of about 70% by weight of Cu and about 30% by weight of Ni)

Ratio of glass frit in solid content: about 10 vol %

Composition of glass frit: BaO—$B_2O_3$—$SiO_2$—LiO—NaO-based glass frit

Specifically, when the glass frit is 100% by weight, in terms of an oxide, the content of BaO is changed as BaO: about 5%, about 10%, about 20%, about 50%, or about 60% by weight, and the proportion of other components ($B_2O_3$, $SiO_2$, LiO, NaO) was changed according to the change in the BaO content.

The proportion of BaO in the glass frit used for the conductive paste for forming the baked layer was changed as shown in Table 2 to form the external electrode.

Evaluation Test

The evaluation test was conducted in a similar manner as the sample numbers 1 to 51.

Measurement of Length of Ba Diffusion Region

Each sample (n=5) was polished in a cross section (polished to about ½ point in the width direction), and the cross section was observed by WDX of 2000 times magnification. A maximum length of the Ba diffusion region present in the dielectric layer was measured in the normal direction from the interface between the dielectric layer and the external electrode. Since there are two external electrodes per chip, ten measurement values can be obtained ((n=5)×(two external electrodes)=10). The minimum value among the ten measurement values is described in the "Length of Ba diffusion region" section of Table 2.

Further, in (Evaluation of bondability between dielectric layer and external electrode), the bondability evaluation for one in which about 98% or more of the interface between the dielectric layer and the external electrode was bonded for both of the external electrodes in all of the five samples was shown in Table 2 as "◉".

TABLE 2

| Sample No. | x | y | m | a | b | c | Proportion of BaO in glass frit [% by weight] | Length of Ba diffusion region [μm] | Ni ratio in metal powder in baked layer [% by weight] | Bondability between dielectric layer and external electrode | Delamination | TCC (ppm/° C.) | | Number of NG in accelerated moisture resistance load test |
|---|---|---|---|---|---|---|---|---|---|---|---|---|---|---|
| | | | | | | | | | | | | −55° C. | 125° C. | |
| 52 | 0.6 | 0.5 | 0.8 | 0 | 5 | 40 | 5  | 1.8 | 0  | ○ | ○ | 25 | 26 | 9/100 |
| 53 | 0.6 | 0.5 | 0.8 | 0 | 5 | 40 | 10 | 3.1 | 0  | ○ | ○ | 27 | −5 | 2/100 |
| 54 | 0.6 | 0.5 | 0.8 | 0 | 5 | 40 | 20 | 3.3 | 30 | ◉ | ○ | 5  | 20 | 1/100 |

TABLE 2-continued

| Sample No. | x | y | m | a | b | c | Proportion of BaO in glass frit [% by weight] | Length of Ba diffusion region [μm] | Ni ratio in metal powder in baked layer [% by weight] | Bondability between dielectric layer and external electrode | Delamination | TCC (ppm/°C.) −55° C. | TCC (ppm/°C.) 125° C. | Number of NG in accelerated moisture resistance load test |
|---|---|---|---|---|---|---|---|---|---|---|---|---|---|---|
| 55 | 0.6 | 0.5 | 0.8 | 0 | 5 | 40 | 50 | 3.4 | 0 | ○ | ○ | 28 | 26 | 0/100 |
| 56 | 0.6 | 0.5 | 0.8 | 0 | 5 | 40 | 60 | 3.7 | 30 | ◎ | ○ | 29 | 24 | 4/100 |

Table 2 shows that when the metal powder in the baked layer contains Ni, the bondability between the dielectric layer and the external electrode is further improved.

Further, it shows that the moisture resistance is improved when the length of the Ba diffusion region is about 3 μm or more.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A dielectric ceramic composition comprising:
    as a main component, a perovskite compound containing Sr and Zr and may contain Ca and/or Ti, further contains Li and Si, and may contain Mn; wherein when a total content of Zr and Ti is 100 parts by mol:
    a total content of Sr and Ca is (100×m) parts by mol where $0.8 \leq m \leq 1.3$;
    a content a of Mn is $0 \leq a \leq 10$ parts by mol;
    a content b of Li is $5 \leq b \leq 15$ parts by mol;
    a content c of Si is $20 \leq c \leq 40$ parts by mol;
    a molar ratio x of Ca/(Sr+Ca) is $0 \leq x \leq 0.8$; and
    a molar ratio y of Ti/(Zr+Ti) is $0 \leq y \leq 0.5$.

2. A multilayer ceramic capacitor comprising:
    a laminate including a plurality of dielectric layers including the dielectric ceramic composition according to claim 1, and a plurality of internal electrode layers disposed between the dielectric layers; and
    a plurality of external electrodes disposed on an outer surface of the laminate and electrically connected to the plurality of internal electrode layers; wherein
    each of the plurality of external electrodes includes a baked layer including a glass frit, and a metal plating layer provided on the baked layer.

3. The multilayer ceramic capacitor according to claim 2, wherein
    a diffusion region of Ba, Ca, or Sr exists in a vicinity of an interface at which a dielectric layer of the plurality of dielectric layers is in contact with a respective external electrode of the plurality of external electrodes; and
    a length of the diffusion region is about 3 μm or more in a normal direction from the interface of the dielectric layer and the respective external electrode.

4. The multilayer ceramic capacitor according to claim 2, wherein the baked layer includes Cu as a main component and further includes Ni.

5. The multilayer ceramic capacitor according to claim 2, wherein
    an average thickness of the plurality of dielectric layers is about 1.0 μm or less; and
    an average thickness of the plurality of internal electrode layers is about 1.5 times or more the average thickness of the dielectric layer.

6. The multilayer ceramic capacitor according to claim 2, wherein
    an average thickness of the plurality of dielectric layers is about 1.0 μm or less; and
    an average strain angle of the plurality of internal electrode layers is about 5° or less.

7. The multilayer ceramic capacitor according to claim 2, wherein a main component of each of the plurality of internal electrode layers is Cu.

8. The dielectric ceramic composition according to claim 1, wherein the perovskite compound as a composition formula represented as $(Sr_{1-x}Ca_x)_m(Zr_{1-y}Ti_y)O_3 [0 \leq x \leq 0.8, 0 \leq y \leq 0.5, 0.8 \leq m \leq 1.3]$.

9. The dielectric ceramic composition according to claim 1, further comprising an additive including at least one of an organic binder, a solvent, and a plasticizer.

10. The dielectric ceramic composition according to claim 9, wherein the organic binder is at least one of polyvinyl butyral, acrylic resin, and methacrylic resin.

11. The dielectric ceramic composition according to claim 9, wherein the solvent is at least one of toluene and isopropylene alcohol.

12. The dielectric ceramic composition according to claim 9, wherein the plasticizer in di-n-butyl phthalate.

13. The multilayer ceramic capacitor according to claim 2, wherein a number of the plurality of dielectric layers is 35 or more and 45 or less.

14. The multilayer ceramic capacitor according to claim 2, wherein a number of the plurality of internal electrode layers is 36 or more and 46 or less.

15. The multilayer ceramic capacitor according to claim 2, wherein an average thickness of the plurality of internal electrode layers is about 1.0 μm or more and about 1.6 μm or less.

16. The multilayer ceramic capacitor according to claim 2, wherein an average thickness of the plurality of internal electrode layers is about 1.2 μm or more and about 1.4 μm or less.

17. The multilayer ceramic capacitor according to claim 2, wherein the glass frit is a BaO—B$_2$O$_3$—SiO$_2$-based glass frit or a BaO—B$_2$O$_3$—SiO$_2$—LiO—NaO-based glass frit.

* * * * *